United States Patent Office 3,708,482
Patented Jan. 2, 1973

3,708,482
4-MORPHOLINOETHOXY-BENZOPHENONES
Francesco Lauria, Milan, Vittorio Vecchietti, Pavia, and Willy Logemann, Milan, Italy, assignors to Carlo Erba S.p.A., Milan, Italy
No Drawing. Filed Apr. 10, 1970, Ser. No. 27,432
Claims priority, application Italy, Apr. 15, 1969, 15,572/69
Int. Cl. C07d 87/34
U.S. Cl. 260—247.7 C
6 Claims

ABSTRACT OF THE DISCLOSURE

Basic ethers are disclosed, for instance of the formula:

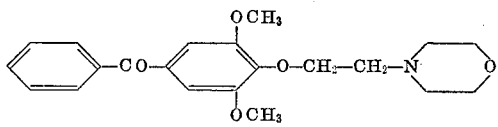

methods of preparation for these ethers are also disclosed; for example by the reaction of the sodium salt of dimethylformamide with 3,5-dimethoxy-4-hydroxybenzophenone in the reaction solvent dimethylformamide. These basic ethers have been found to exhibit anti-tussive activity.

BACKGROUND OF THE INVENTION

During the last ten years (after the development of more accurate testing processes) many anti-tussive compounds have been synthesized and tested in an attempt to obtain products devoid of troublesome side effects, especially habituation and influence on the respiratory rhythm typically found with natural alkaloids. These disadvantages are present, however, even in compounds derived from natural alkaloids, e.g. the metadone derivatives.

Some known synthetic anti-tussive compounds are basic esters, which are readily hydrolyzed by enzymes present in the upper part of the intestinal tract, and are thus inactivated. In fact, a number of known β-cyano-β,β-diphenyl-propionic acid basic esters which had proved effective in pharmacological tests when administered by the intravenous route, were later found to be ineffective in subsequent clinical tests when administered by the oral route. We have now found that certain aromatic ethers with basic side chains exhibit anti-tussive activity and are not hydrolyzed by intestinal enzymes.

DESCRIPTION OF THE INVENTION

This invention relates to certain ethers having anti-tussive (anti-cough) activity, to a process for their preparation and to pharmaceutical compositions containing them.

The ethers of the invention have the general formula:

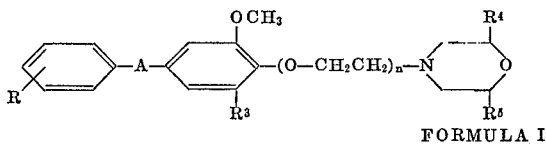

FORMULA I wherein:

R is a hydrogen or halogen atom, a haloalkyl group, a lower alkyl or alkoxy group, an amino group or a substituted amino group of the formula:

where $R_6$ and $R_7$ are independently hydrogen or lower alkyl;

A is a carbonyl group or a group of formula:

$$-C(R^1)(R^2)-$$

wherein:

$R^1$ is a hydrogen atom or a lower alkyl, hydroxymethyl or hydroxy group; and
$R^2$ is a hydrogen atom or a lower alkyl group;
$n$ is an integer of 1 to 3;
$R^3$ is a hydrogen or halogen atom or a lower alkyl or alkoxy group; and
$R^4$ and $R^5$ may be the same or different and may be a hydrogen atom or a lower alkyl group.

The compound of Formula I is useful both in the free base form and in the acid addition salt form, both forms being within the perview of the invention.

The terms "lower alkyl" and "lower alkoxy" as used herein refer to those groups having from 1 to 4 carbon atoms; these groups, of course, can be either branched or straight chain. For instance, such groups are methyl, ethyl, propyl, isopropyl, butyl, n-butyl, methoxy and ethoxy.

Appropriate pharmaceutically-acceptable salts within the scope of the invention are those derived from mineral acids such as hydrochloric acid, hydrobromic acid, hydriodic acid, nitric acid, phosphoric acid, sulfamic acid, and sulfuric acid; and organic acids such as acetic acid, citric acid, tartaric acid, lactic acid, ascorbic acid, methanesulfonic acid, ethanesulfonic acid, quinic acid, 3-hydroxy-2-naphthoic acid, naponic acid (1,5-naphthalenedisulfonic acid), acetylsalicyclic acid, salicylic acid, mucic acid, muconic acid, benzoic acid, and the like, giving the hydrochloride, hydrobromide, hydriodide, nitrate, phosphate, sulfamate, sulfate, acetate, citrate, tartrate, lactate, ascorbate, methanesulfonate, ethanesulfonate, quinate, 3-hydroxy-2-naphthoate, naponate, acetylsalicylate, salicylate, mucate, and muconate, respectively.

When the group R from the above formula is a substituted amino group, it is suitably a mono- or dialkyl-amino group and preferaably a dimethylamino group. Other preferred R groups are fluorine, chlorine and bromine atoms or methyl groups. The R group is preferably in the 4-position but can, if desired, be in the 2- or 3-position. The value of $n$ is preferably about 1.

The groups $R^1$ and $R^2$ are preferably both hydrogen atoms or both ethyl groups. Alternatively, $R^1$ is a hydroxy group and $R^2$ is a hydrogen atom or a butyl group.

Preferably, the $R^3$ group is either a hydrogen atom or a methoxy group. Other preferred examples of $R^3$ are bromine, chlorine and fluorine. The $R^4$ and/or $R^5$ groups are preferably methyl groups.

It has been found that the reduction of the keto group of the benzophenone ethers to the corresponding alcohol gives products with lower anti-tussive activity, whereas catalytic reduction of the keto group to a methylene group results in products with a high anti-tussive activity and lower toxicity.

Examples of the preferred acid addition salts according to the present invention are those with inorganic acids such as hydrochloric, phosphoric and sulphuric acid and organic acids such as citric acid and o-(p'-hydroxybenzoyl)-benzoic acid.

The following reactions describe several methods of preparing the compounds of the invention as disclosed above. While the reactions are conveniently conducted at atmospheric pressure, higher and lower pressures may also be used. The reactions may be conducted with or without a solvent. However, when a solvent is used it should be inert to the particular reactants. Examples of suitable solvents are cyclohexane and dimethylformamide.

Preparation of the compound of Formula I:

(a) reacting a compound of general formula:

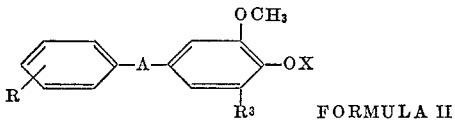

FORMULA II as prepared according to the method of R. B. Moffett, A. R. Hanze and P. H. Seay, J. Med. Chem. 7, 178 (1964), the disclosure of which is hereby incorporated by reference, wherein:

X is an alkali metal atom such as Na, K, or the like; and A, R and $R^3$ are as defined above, with a compound of general formula:

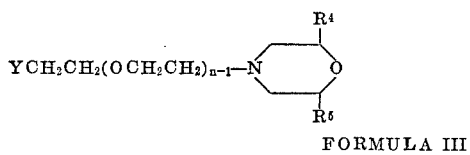

FORMULA III prepared by reaction of 2-chlorobromoethane, β-chloro-β'-chloroethoxyethyl-ether or β,β' - dichloro-diethylether with a compound of general Formula V below, wherein:

Y is a halogen atom such as chlorine, fluorine and bromine; and $n$, $R^4$ and $R^5$ are as defined above;

the reaction conducted at a temperature from about 25° C. to about 200° C.;

(b) reacting a compound of general Formula IV:

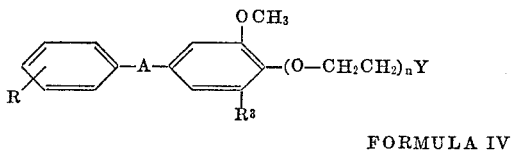

FORMULA IV prepared by reacting the alkali salts of compounds of general Formula II with 2-chlorobromoethane, β,β'-dichloro-diethylether or β - chloro - β' - chloro-ethoxyethyl-ether, wherein:

Y is a halogen atom as defined above; and $n$, A, R and $R^3$ are as defined above, with a compound of general formula:

FORMULA V which can be found in commerce.

wherein:

$R^4$ and $R^5$ are as defined above;

the reaction being conducted at a temperature from about 25° C. to about 200° C.;

(c) reacting a compound of general formula:

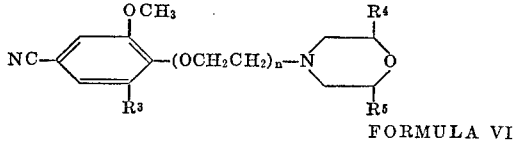

FORMULA VI prepared by reacting compounds of Formula III with the alkali salts of compounds of general formula

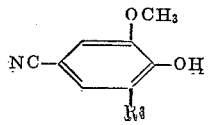

wherein $R^3$ is as defined above, which may in turn be obtained according to the method of T. van ES, J. Chem. Soc. 1965, 1564, the disclosure of which is hereby incorporated by reference, wherein:

$n$, $R^3$, $R^4$ and $R^5$ are as defined above, with a compound of general formula:

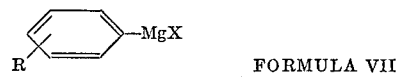

FORMULA VII

Prepared according to the method described in M. S. Kharasch and O. Reinmuth, "Grignard Reactions of Nonmetallic Substances," New York, Prentice Hall Inc., 1954, the disclosure of which is hereby incorporated by reference.

wherein:

X is a halogen atom such as chlorine, fluorine and bromine; and

R is as defined above; the reaction being conducted at a temperature from about 0° C. to about 10° C.;

(d) reacting a compound of general formula:

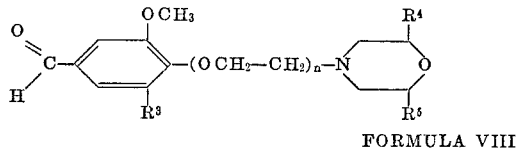

FORMULA VIII prepared by reacting the alkali salts of compounds of general formula

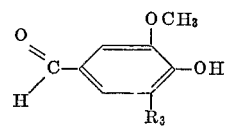

wherein $R^3$ is as defined above, with compounds of general Formula III, wherein:

$n$, $R^3$, $R^4$ and $R^5$ are as defined above, with a compound of general Formula VII above;

(e) oxidizing a compound of general Formula I above wherein:

A is a group of the general formula —C($R^1$)($R^2$)— wherein:

$R^1$ is a hydroxy group; and $R^2$ is a hydrogen atom; and $n$, R, $R^3$, $R^4$ and $R^5$ are as defined above, in the presence of $CrO_3$ at a temperature of from about 0° C. to about 100° C.;

(f) reducing a compound of general Formula I wherein:

A is a carbonyl group; and $n$, R, $R^3$, $R^4$ and $R^5$ are as defined above, by reaction with atomic hydrogen in the presence of a catalyst selected from the group consisting of Pd, Pt and Nickel/Raney at a temperature of from about 25° C. to about 100° C. to give a compound of general Formula I wherein:

A is a group of the general formula —C($R^1$)($R^2$)— where $R^1$ is a hydroxy group; and $R^2$ is a hydrogen atom, or alternatively where both $R^1$ and $R^2$ are hydrogen atoms;

(g) reducing a compound of general formula:

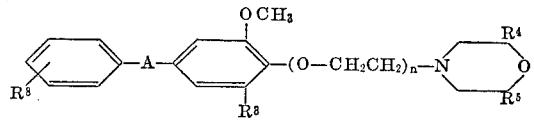

prepared by reacting a compound of Formula II, wherein R is a nitro group, with a compound of Formula III, wherein:

R⁸ is a nitro group; and $n$, A, $R^3$, $R^4$ and $R^5$ are as defined above by reaction with atomic hydrogen at a temperature of about 15° C. to about 50° C.; to give a compound of general Formula I where R is an unsubstituted amino group, and subsequently converting the reaction product by an alkylation reaction with formic acid and formic aldehyde at a temperature of 50 to 120° C. to a compound of general Formula I where R is a substituted amino group.

The compounds produced following the above reactions can also be conveniently converted to the corresponding acid addition salts by reaction with the appropriate acid thus resulting in a pharmaceutically acceptable product.

The ethers produced according to the present invention were evaluated for anti-tussive activity by determining the lowest dosage showing total cough inhibition in cats using Domenjoz's method (Arch. Exper. Path. und Pharmakol., 1952, 215, 1924). Solutions of the ethers in distilled water generally from 0.1 to 10 g. per 100 ml. water were administered by the intra-duodenal route route through a previously inserted cannula. The doses reported in the following table refer to the hydrochloride salts of the particular compounds tested. It was observed that the ethers produced according to the present invention are tasteless, which is a particularly advantageous feature from the pharmaceutical formulation and therapeutic viewpoints.

The anti-tussive compositions of the invention can be administered orally or parenterally, preferably as oral solid compositions, such as capsules, tablets, drageés and pills which contain an appropriate amount of the general Formula I above and/or a pharamceutically-acceptable salt thereof per dosage unit. The solid compositions for oral administration can contain from about 50 to 1000 mg. of the compound of general Formula I and/or salt thereof per dosage unit. The liquid preparations for oral use are also prepared in such a manner that each dosage unit, such as one teaspoon or a given number of milliliters contains from about 20 to 200 mg. of the compound of general Formula I and/or a salt thereof.

As used herein, the term "pharmaceutical carrier" denotes a solid or liquid devoid of significant anti-tussive activity and is composed of a single substance or a number of substances. The compositions can be in the form of tablets, lozenges, capsules (either liquid or dry filled), drageés, pills, powders and aqueous and non-aqueous solutions or suspensions. Some examples of the substances which can serve as pharmaceutical carriers in the compositions of the invention are gelatin capsules; sugars such as lactose and sucrose; starches, such as corn starch and potato starch; cellulose derivatives, such as sodium carboxymethyl cellulose, ethyl cellulose, methyl cellulose, celluose acetate phthalate; gelatin; talc; stearic acid; magnesium stearate; vegetable oils, such as peanut oil, cottonseed oil, sesame oil, olive oil, corn oil, and oil of theobroma; propylene glycol; glycerin; sorbitol; polyethylene glycol; water; agar; alginic acid; isotonic saline; and phosphate buffer solutions, as well as other non-toxic compatible substances used in pharmaceutical formulations.

The following table reflects the laboratory test results. Initially, the $LD_{50}$ in mice for the respective compounds was determined in order to calculate a reasonable dosage for cats. Once the dosage was established, the respective compounds were administered to the cats according to Domenjoz's method above. All dosages were measured in milligrams of drug per kilogram of body weight of the particular test animal.

TABLE A

| Compound | Toxicity in mice, orally (mg./kg.) | Dosage, total cough inhibition, intraduodenally (mg./kg.) | Duration of total inhibition (minutes) |
| --- | --- | --- | --- |
| (structure) | 338 | 20 | 40 |
| (structure) | 610 | 35 | 45 |
| (structure) | 550 | 50 | 65 |
| (structure) | 552 | 30 | 60 |
| (structure) | 500 | 35 | 60 |
| (structure) | 500 | 50 | 60 |

The invention is illustrated by the following examples but is not, however, to be limited thereto.

EXAMPLE 1

50% sodium hydride (2 g.) in oil was suspended in dimethylformamide (300 ml.) and quickly treated with 3,5-dimethoxy-4-hydroxybenzophenone (10.32 g.) in dimethylformamide (50 ml.). The reaction mixture was subsequently heated at 120–130° C. for 4 hours and stirred to give a yellow suspension of its sodium salt. The reaction mixture was then cooled and β-morpholinoethylchloride (9 g.) was added and the mixture heated at 120–130° C. for two hours. A precipitate of sodium chloride was filtered off and the solvent was evaporated in vacuo.

The residue was distilled to give the free base 3,5-dimethoxy-4-(β - morpholinoethoxy) - benzophenone, B.P. 230° C. at 0.8 mm. The hydrochloride was obtained by reaction with gaseous hydrogen chloride in ether and then crystallized from tetrahydrofuran/99% ethanol/petroleum ether, M.P. 146–8° C.

EXAMPLES 2–5

The following compounds were prepared by the process described in Example 1 with the indicated starting material substituted for the 3,5-dimethoxy-4-hydroxybenzophenone of Example 1; the resultant products are as indicated.

TABLE B

| Example | Starting material | Product |
| --- | --- | --- |
| 2 | 3,5-dimethoxy-2'-methyl-4-hydroxybenzophenone. | 3,5-dimethoxy-2'-methyl-4-(β-morpholinoethoxy)-benzophenone. |
| 3 | 3,5-dimethoxy-4'-methyl-4-hydroxybenzophenone. | 3,5-dimethoxy-4'-methyl-4-(β-morpholinoethoxy)-benzophenone. |
| 4 | 3-methoxy-5-methyl-4-hydroxybenzophenone. | 3-methoxy-5-methyl-4-(β-morpholinoethoxy)-benzophenone. |
| 5 | 3-methoxy-5-bromo-4-hydroxybenzophenone. | 3-methoxy-5-bromo-4-(β-morpholinoethoxy)-benzophenone. |

EXAMPLE 6

Sodium methoxide (1.2 g.) in dimethylformamide (150 ml.) was stirred with 3,5-dimethoxy-4'-chloro-4-hydroxy-benzophenone (6 g.) in dimethylformamide (50 ml.), for 2 hours at 120° C. The reaction mixture was then treated with β-morpholinoethyl chloride (3.4 g.) and heated for 1 hour at 140° C., then evaporated to dryness, and treated with water to give a solid material. The mixture was filtered, washed and crystallized from cyclohexane to give 3,5-dimethoxy-4'-chloro-4-(β-morpholinoethoxy) - benzophenone (6.5 g.), M.P. 91–92° C. The product was then reacted at about 0° C. with gaseous hydrogen chloride in ether to give, after crystallization from isopropanol, the corresponding hydrochloride which had a melting point of 187–9° C.

EXAMPLES 7–10

The following compounds were prepared by the process described in Example 6, with the indicated starting material substituted for the 3,5-dimethoxy-4'-chloro-4-hydroxy-benzophenone of Example 6; the resultant products are as indicated.

TABLE C

| Example | Starting material | Product |
| --- | --- | --- |
| 7 | 3,5-dimethoxy-4'-fluoro-4-hydroxybenzophenone. | 3,5-dimethoxy-4'-fluoro-4-(β-morpholinoethoxy)-benzophenone. |
| 8 | 3,5-dimethoxy-4'-bromo-4-hydroxybenzophenone. | 3,5-dimethoxy-4'-bromo-4-(β-morpholinoethoxy)-benzophenone. |
| 9 | 3,5-dimethoxy-2'-chloro-4-hydroxybenzophenone. | 3,5-dimethoxy-2'-chloro-4-(β-morpholinoethoxy)-benzophenone. |
| 10 | 3,5-dimethoxy-3'-trifluoromethyl-4-hydroxybenzophenone. | 3,5-dimethoxy-4-(β-morpholinoethoxy)-3'-trifluoromethylbenzophenone. |

EXAMPLE 11

3,5-dimethoxy-4-[β-(β'-chloroethoxy)-ethoxy] - benzophenone (7 g., 215°/0.2 mm.) [produced from the reaction of 3,5-dimethoxy-4 - hydroxybenzophenone, sodium salt, and β,β'-dichlorodiethylether in dimethylformamide] dissolved in anhydrous ethanol (25 ml.) was treated with morpholine (7 ml.) and heated in a Carius apparatus at 120° C. for 8 hours and stirred, then evaporated to dryness. The residue was distributed between water and ether portions. The ethereal layer was washed with 50 ml. of 1% sodium hydroxide. The solvent was removed by evaporation from the product on a steam bath to give 3,5-dimethoxy-4-[β-(β'-morpholinoethoxy) - ethoxy]benzophenone, which was reacted with gaseous hydrogen as in Example 6 to give, after crystallization from isopropanol, the corresponding hydrochloride having a melting point of 75° C.

EXAMPLE 12

3,5 - dimethoxy-4-{β-[β'-(β''-chloroethoxy)ethoxy]ethoxy}benzophenone (8.17 g.; B.P. 190–200° C./0.01 mm.) [produced from the reaction of 3,5-dimethoxy-4-hydroxybenzophenone sodium salt and β-chloro-β'-chloroethoxyethyl-ether at about 120° C.] in ethanol (25 ml.) containing morpholine (7 g.) was heated in a Carius tube at 100° C. for two hours and stirred. The reaction mixture was then evaporated to dryness and, after dilution with water, and extracted with diethylether. The resulting mixture was washed with 50 ml. of sodium hydroxide 0.5%. The residue, after concentration, was distilled under high vacuum to give, as a yellowish oil, the product 3,5-dimethoxy - 4 - {β-[β'-(β''-morpholinoethoxy)ethoxy]ethoxy}-benzophenone, B.P. 235–240° C./0.01 mm.

EXAMPLE 13

Similarly, 3,5 - dimethoxy-4'-chloro-4-{β-[β'-(β''-morpholinoethoxy)ethoxy]-ethoxy}-benzophenone was prepared by the process described in Example 12, with 3,5-dimethoxy - 4' - chloro-{β-[β'-(β''-chloroethoxy)ethoxy]ethoxy}benzophenone substituted for the 3,5-dimethoxy-4-{β-[β-(β'' - chloroethoxy)ethoxy]ethoxy}benzophenone of Example 12.

EXAMPLE 14

3,5-dimethoxy-4'-dimethylamino-4-hydrobenzophenone (3 g.) in dimethylformamide (30 ml.) was added to 0.5 g. of 50% sodium hydride in oil with dimethylformamide (200 ml.) as the solvent. The resulting mixture was heated for 2 hours at 100° C. with stirring to give an orange-yellow solution of the corresponding sodium salt. β-morpholinoethylchloride (2.2 g.) was added, and the reaction was heated to 140° C. for 3 hours. The inorganic salts were filtered off and the mixture was then concentrated in vacuo. The residue was then dissolved in ether and washed repeatedly with 50 ml. portions of sodium hydroxide 0.5%. Removal of the ether gave the product 3,5-dimethoxy - 4' - dimethylamino-4-(β-morpholinoethoxy)-benzophenone.

EXAMPLE 15

The compound 3,5-dimethoxy-4'-dimethylamino-4-(β-morpholinoethoxy)-benzophenone [the compound prepared by Example 14] can also be prepared by first reducing 3,5-dimethoxy-4-(β - morpholinoethoxy)-4'-nitrobenzophenone (4.2 g.) with palladium on charcoal (1 g.) in ethanol and hydrogen, then subsequently methylating the resulting product by reaction with formic acid (50 ml.) and formaldehyde (20 ml.) at 100° C. for 16 hours.

EXAMPLE 16

A mixture of 3,5-dimethoxy-4-[β - (β' - chloroethoxy) ethoxy]-benzophenone (3.65 g.) and 2-methylmorpholine (2.3 g.) dissolved in ethanol (10 ml.) was heated for 8 hours in a Carius tube at 120° C. The product was further treated as in Example 11 to give 3,5-dimethoxy-4-{β-[β' - (2' - methylmorpholino)ethoxy]ethoxy} - benzophenone, the corresponding hydrochloride, having a M.P. of 136–7° C., was obtained after crystallization from benzene/petroleum ether, as described in Example 6.

EXAMPLE 17

3,5-dimethoxy-4-hydroxy-diphenylmethane (5.5 g.) in dimethylformamide (25 ml.) was added to sodium methoxide (1.25 g.) in dimethylformamide (100 ml.) and maintained for 0.5 hour at 80° C. β-morpholinoethylchloride (3.4 g.) was added and the mixture was heated for 2 hours at 100° C. with stirring. The inorganic salts were filtered off, the solution concentrated in vacuo and the residue dissolved in ether and washed with water. The solvent was evaporated and the residue reacted with gaseous hydrogen chloride in ether to give, after crystallization from ethyl acetate/petroleum ether, 3,5-dimethoxy - 4 - (β-morpholinoethoxy)diphenylmethane-hydrochloride, M.P. 112–4° C.

EXAMPLE 18

3,5-dimethoxy - 4 - (β-morpholinoethoxy)-4'-chlorodiphenylmethane was prepared by the process described in Example 17, with 3,5-dimethoxy-4-hydroxy-4'-chloro-diphenylmethane substituted for the 3,5-dimethoxy-4-hydroxy-diphenylmethane of Example 17.

EXAMPLE 19

3,5-dimethoxy-4-(β - morpholinoethoxy)benzophenone (5.5 g.) in ethanol (100 ml.) was hydrogenated under 2–3 atmospheres pressure in the presence of palladium on charcoal (2 g.) and in the presence of 1 N hydrochloric acid (15.1 ml.). After filtration and concentration, crystallization of the residue from benzene/petroleum ether gave 3,5-dimethoxy-4-(β - morpholinoethoxybenzohydrol hydrochloride, M.P. 121–123° C.

EXAMPLE 20

4'-chloro-3,5-dimethoxy-4-[β-(β'-chloroethoxy)ethoxy]-benzophenone (10 g.) and morpholine (6.5 g.) dissolved in absolute ethanol (30 ml.) were heated in a Carius tube at 125° C. for 12 hours. After cooling, the reaction mixture was evaporated to dryness on a steam bath and distributed between an aqueous layer containing 10% hydrochloric acid and the ether layer. The aqueous phase was subsequently basified with concentrated sodium hydroxide and extracted with ether. Evaporation of the ether solvent gave the product 4'-chloro-3,5-dimethoxy-4-[β-(β'-morpholinoethoxy)ethoxy]-benzophenone. The product was then reacted in methanol solution with phosphoric acid to give, after crystallization from methanol/ether, the phosphate addition salt having a melting point range of 79–80° C.

EXAMPLES 21–22

The following compounds were prepared by the process described in Example 20, with the indicated starting materials substituted for the morpholine of Example 20; the resultant products are as indicated.

TABLE D

| Example | Starting material | Product |
| --- | --- | --- |
| 21 | 2-methylmorpholine | 4'-chloro-3,5-dimethoxy-4-[β-[β'-(2''-methylmorpholine)ethoxy]ethoxy]-benzophenone. |
| 22 | 2,6-dimethylmorpholine | 4'-chloro-3,5-dimethoxy-4-[β-[β'-(2'',6''-dimethylmorpholine)ethoxy]ethoxy]-benzophenone. |

EXAMPLE 23

4'-chloro - 3,5 - dimethoxy-4-(β-chloroethoxy)-benzophenone (5.5 g.) and 2-methylmorpholine (4.7 g.) in alcoholic solution were heated at 110° C. for 5 hours to give 4'-chloro-3,5-dimethoxy-4-[β-(2''-methylmorpholino)ethoxy]-benzophenone, which was subsequently converted to the hydrochloride addition salt as in Example 4 to give, after crystallization from benzene/benzin, the hydrochloride addition salt, M.P. 75–6° C.

EXAMPLE 24

4' - chloro-3,5-dimethoxy-4-[β-(2'',6''-dimethylmorpholinoethoxy]-benzophenone was prepared by the process described in Example 23, with 2,6-dimethylmorpholine substituted for the 2-methylmorpholine of Example 23.

EXAMPLE 25

A suspension of the sodium salt of 3-phenyl-3-(3'-methoxy-4'-hydroxyphenyl)-pentane [from the reaction of 1 g. of 50% sodium hydride in oil and 5.4 g. of the corresponding phenol], was heated with β-morpholinoethyl chloride (3.5 g.) at 130° C. for 3 hours. The inorganic salts were filtered off, the solution concentrated in vacuo and the residue dissolved in ether and washed with water. The solvent was evaporated and the residual oil was reacted with gaseous hydrogen chloride in ether to give, after crystallization from benzene/petroleum ether, the product 3-phenyl-3-[3'-methoxy-4'-(β-morpholinoethoxy)-phenyl]-pentane hydrochloride.

EXAMPLE 26

To a solution of Grignard reagent prepared from magnesium (1.5 g.) and p-chlorobromobenzene (11.4 g.) in 100 ml. of tetrahydrofurane, 3,5-dimethoxy-4-(β-morpholino-ethoxy)-benzonitrile (5.9 g.) is added. The mixture is heated to reflux for 14 hours, then cooled, treated with a solution of 5% HCl and refluxed another hour. After extraction with ether which was discarded, the solution is treated with 5% NH$_4$OH. The brown precipitate thus formed was collected and crystallized from the solvent cyclohexane, resulting in the product 3,5-dimethoxy-4'-chloro-4-(β-morpholinoethoxy)-benzophenone, M.P. 91–92° C.

EXAMPLE 27

3,5-dimethoxy - 4 - (β-morpholinoethoxy)-benzaldehyde (11.6 g.) is added to a Grignard reagent prepared from magnesium (3 g.) and p-chlorobromobenzene (23 g.). The mixture is refluxed for 4 hours, chilled and 15% NH$_4$Cl solution added. The organic phase of the reaction mixture is separated and concentrated. To the residual oil containing (3,5-dimethoxy-4-(β-morpholinoethoxy)-4'-chloro-benzohydrol), CrO$_3$ (4.5 g.) in pyridine solution was added. After 15 hours at room temperature a quantity of isopropanol is added and the mixture diluted with ice. The solid thus formed is collected and crystallized from cyclohexane. The resulting product 3,5-dimethoxy-4'-chloro - 4 - (β - morpholinoethoxy)-benzophenone was found to have a melting point range of 91–92° C.

We claim:
1. A compound of the formula:

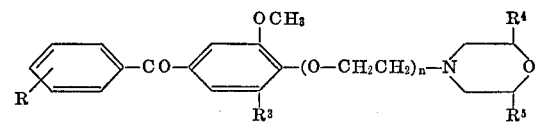

wherein:
R is selected from the group consisting of hydrogen, halogen, halogenated lower alkyl, lower alkyl, and lower alkoxy, $n$ is an integer from 1 to 3,
R$^3$ is selected from the group consisting of halogen, lower alkyl and lower alkoxy, and
R$^4$ and R$^5$ are independently selected from the group consisting of hydrogen and lower alkyl, or the pharmaceutically acceptable salts thereof.

2. The compound is claimed in claim 1 wherein said compound is 3,5-dimethoxy-4-[β-(2″-methylmorpholino)-ethoxy]-4′-chloro-benzophenone.

3. The compound as claimed in claim 1 wherein said compound is 3,5-dimethoxy-4-[β-(2″,6″-dimethylmorpholino)-ethoxy]-4′-chloro-benzophenone.

4. The compound as claimed in claim 1 wherein said compound is 3,5-dimethoxy-4-[β-(β′-morpholinoethoxy)-ethoxy]-benzophenone.

5. The compound as claimed in claim 1 wherein said compound is 3,5-dimethoxy-4-[β-(β′-morpholinoethoxy)-ethoxy]-4′-chloro-benzophenone.

6. The compound as claimed in claim 1 wherein said compound is 3,5-dimethoxy-4-(β-morpholinoethoxy)-4′-chlorobenzophenone.

References Cited
UNITED STATES PATENTS

| | | | |
|---|---|---|---|
| 3,272,841 | 9/1966 | De Wald | 260—326.5 |
| 3,488,357 | 1/1970 | Bencze | 260—294.7 |
| 3,553,332 | 1/1971 | Grunberg | 260—570 |
| 3,560,567 | 2/1971 | Ruegg et al. | 260—570 |

ALEX MAZEL, Primary Examiner

J. TOVAR, Assistant Examiner

U.S. Cl. X.R.

424—248